United States Patent
Moilanen

(10) Patent No.: US 7,493,419 B2
(45) Date of Patent: Feb. 17, 2009

(54) INPUT/OUTPUT WORKLOAD FINGERPRINTING FOR INPUT/OUTPUT SCHEDULERS

(75) Inventor: Jacob Lorien Moilanen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 11/301,730

(22) Filed: Dec. 13, 2005

(65) Prior Publication Data

US 2007/0198750 A1    Aug. 23, 2007

(51) Int. Cl.
| | |
|---|---|
| G06F 3/00 | (2006.01) |
| G06F 11/00 | (2006.01) |
| G06F 15/16 | (2006.01) |
| H04L 1/00 | (2006.01) |
| H04L 12/26 | (2006.01) |
| H04L 12/28 | (2006.01) |
| H04L 12/56 | (2006.01) |
| G01R 31/08 | (2006.01) |
| G08C 15/00 | (2006.01) |
| H04J 1/16 | (2006.01) |
| H04J 3/14 | (2006.01) |

(52) U.S. Cl. ............... 710/6; 710/5; 370/230; 370/398; 709/217

(58) Field of Classification Search ............ 710/6, 710/5; 370/230, 398; 709/217
See application file for complete search history.

(56) References Cited

U.S. PATENT DOCUMENTS

| 5,394,547 | A | * | 2/1995 | Correnti et al. ............ 717/175 |
|---|---|---|---|---|
| 6,160,812 | A | * | 12/2000 | Bauman et al. ............ 370/416 |
| 7,197,577 | B2 | * | 3/2007 | Nellitheertha ................ 710/6 |
| 2004/0205296 | A1 | * | 10/2004 | Bearden .................... 711/129 |
| 2005/0131865 | A1 | * | 6/2005 | Jones et al. ................... 707/2 |
| 2006/0026179 | A1 | * | 2/2006 | Brown et al. ............... 707/100 |
| 2006/0265470 | A1 | * | 11/2006 | Rolia et al. ................. 709/217 |
| 2006/0294044 | A1 | * | 12/2006 | Karlsson et al. ............... 707/1 |
| 2007/0130231 | A1 | * | 6/2007 | Brown et al. ............... 707/204 |

FOREIGN PATENT DOCUMENTS

| JP | 2004030663 A | * | 1/2004 |
|---|---|---|---|
| JP | 2006313545 A | * | 11/2006 |

OTHER PUBLICATIONS

'Business Intelligence: Developing a Characterization of Business Intelligence Workloads for Sizing New Database Systems' from the Proceedings of the 7th ACM International Workshop on Data Warehousing and OLAP DOLAP '04, by Wasserman et al.*

IBM Technical Disclosure Bulletin NN 9507511 'Dynamic Load Sharing for Distributed Computing Environment', Jul. 1995.*

U.S. Appl. No. 10/965,152, filed Oct. 14, 2004, Mollanen et al.

* cited by examiner

Primary Examiner—Niketa I Patel
Assistant Examiner—Steven G Snyder
(74) Attorney, Agent, or Firm—Duke W. Yee; Matthew W. Baca; Mari A. Stewart

(57) ABSTRACT

A computer implemented method in a data processing system for fingerprinting input/output workloads for input/output schedulers. Requests are identified in a workload for an input/output scheduler. Each request is classified to form a set of classifications. Whether an action is needed is determined based on the set of classifications. If the action is needed, the action is initiated.

15 Claims, 5 Drawing Sheets

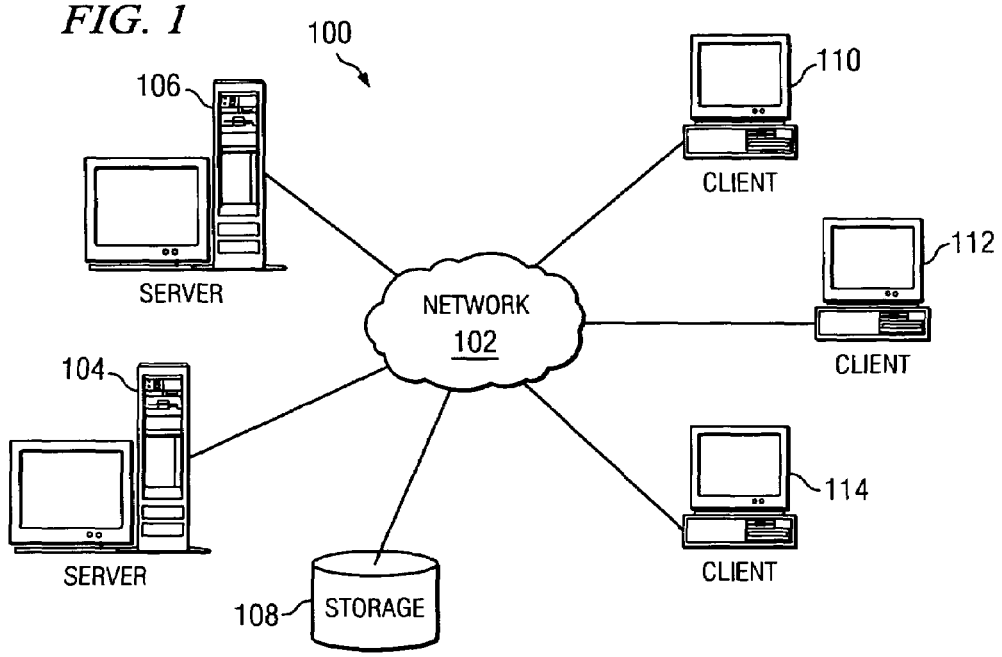
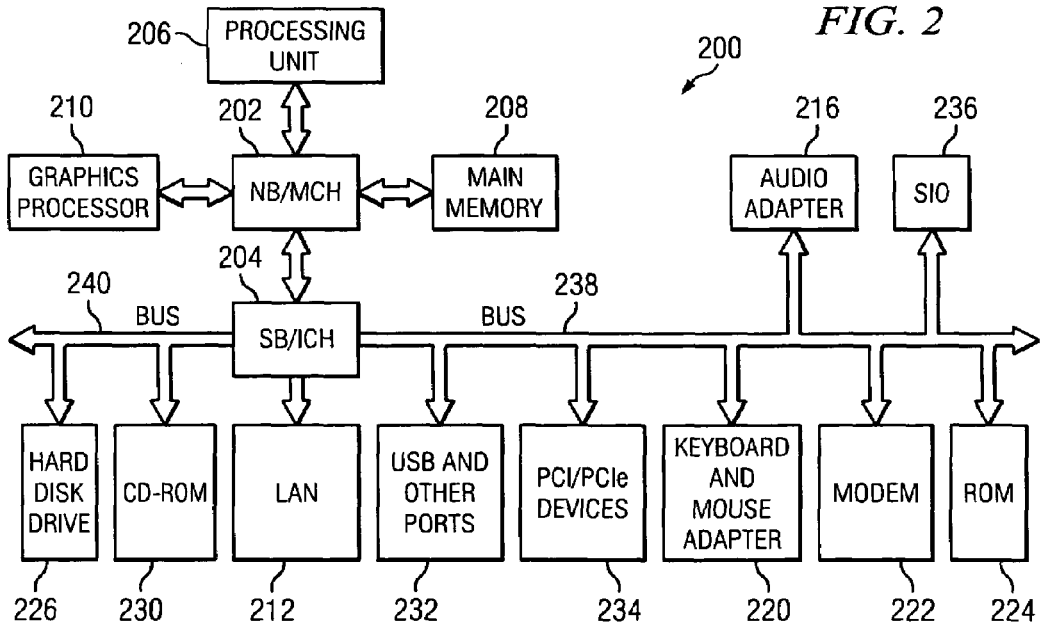

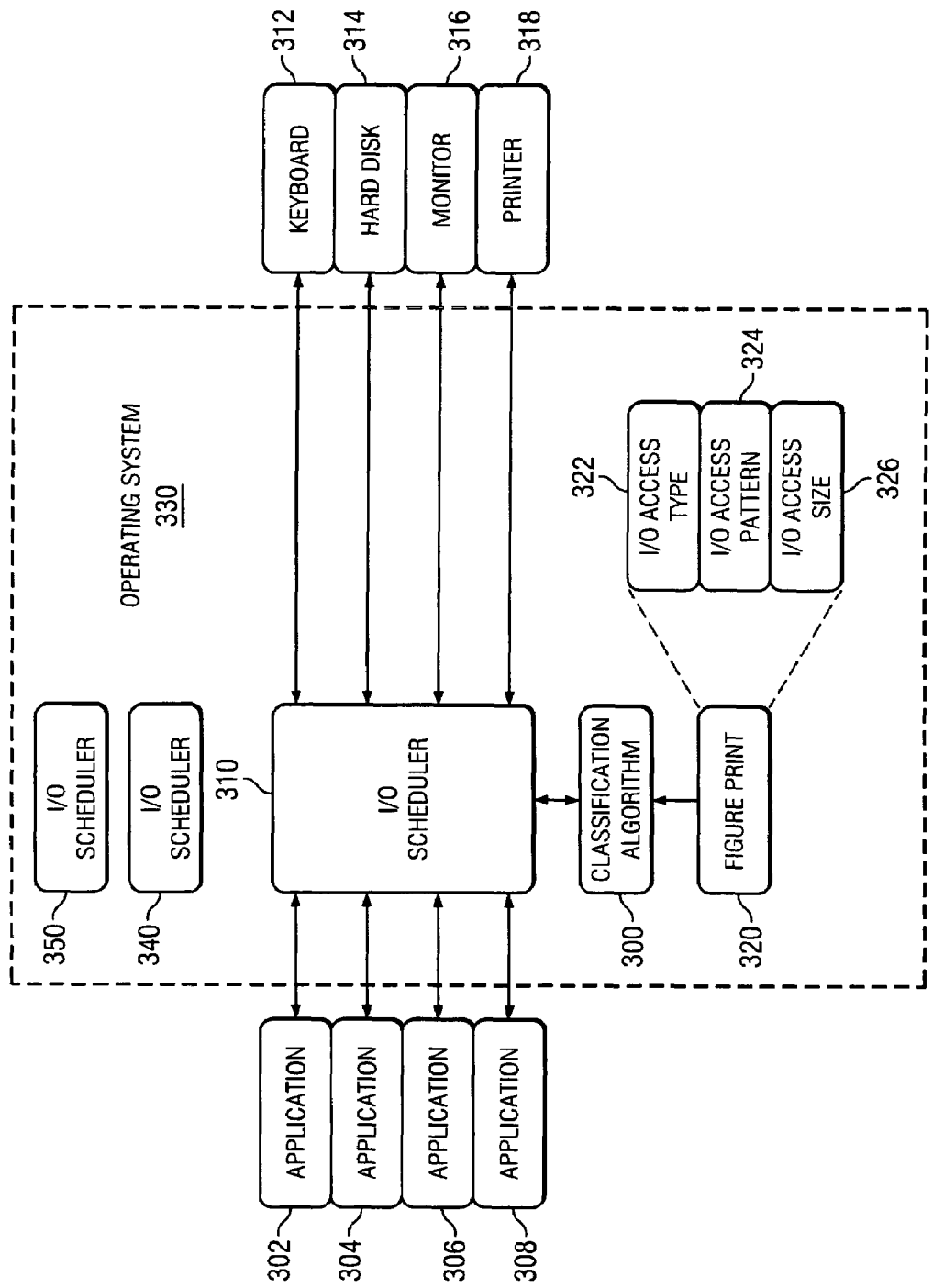

INPUT/OUTPUT WORKLOAD FINGERPRINTING FOR INPUT/OUTPUT SCHEDULERS

BACKGROUND OF THE INVENTION

1. Field of the Invention

The present invention relates generally to an improved data processing system, in particular, to a computer implemented method, a data processing system, and a computer program product for optimizing performance in a data processing system. Still more particularly, the present invention provides a computer implemented method, a data processing system, and a computer program product for input/output workload fingerprinting for input/output schedulers.

2. Description of the Related Art

Input/output schedulers (I/O schedulers) can increase the performance of input/output (I/O) throughput of a system dramatically by tuning the I/O scheduler parameters based on the current workload of the system. The input/output requests scheduled by an I/O scheduler for a system is the I/O workload of the system. A tunable parameter for the I/O scheduler is a parameter that affects the operation of an I/O scheduler. This type of parameter may be changed dynamically while the I/O scheduler is operating. The I/O scheduler parameters may include tunable parameters, such as a default read expire time-out period, a default write batch expire time-out period, and a write queue depth. However, the workload is very difficult for the I/O scheduler to classify because the I/O scheduler only examines a small perspective of what is occurring in the system. If an I/O scheduler could classify the actual current workload, the I/O scheduler could operate much more efficiently by tuning the I/O scheduler parameters based on the current workload of the system.

A common attempt at classifying workloads is made by attempting to recognize a sequential read operation through read-ahead classification. The idea of read-ahead classification is to increase the disk read ahead size by observing a pattern in which a single application accesses a single file on the disk.

Another common attempt at classifying workloads is made by an anticipatory I/O scheduler. This I/O scheduler breaks down all I/O requests for all applications into either a read request or a write request. If the current request is a read request, then the typical anticipatory I/O scheduler will run an adaptive heuristic algorithm (an approximation algorithm) on the probability that another read request will occur that accesses a sector that is a small seek distance away from the sector to be accessed by the current read request, even if the sector to be accessed is for a different file.

SUMMARY OF THE INVENTION

The aspects of the present invention provide a computer implemented method, a data processing system, and a computer program product for input/output workload fingerprinting for input/output schedulers. Requests are identified in a workload for an input/output scheduler. Each request is classified to form a set of classifications. Whether an action is needed is determined based on the set of classifications. If the action is needed, the action is initiated.

BRIEF DESCRIPTION OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

FIG. 1 is a pictorial representation of a network of data processing systems in accordance with an illustrative embodiment of the present invention;

FIG. 2 is a block diagram of a data processing system in accordance with an illustrative embodiment of the present invention;

FIG. 3 is a block diagram illustrating components used for input/output workload fingerprinting for input/output schedulers in accordance with an illustrative embodiment of the present invention;

DETAILED DESCRIPTION OF THE PREFERRED EMBODIMENT

Figure 4:
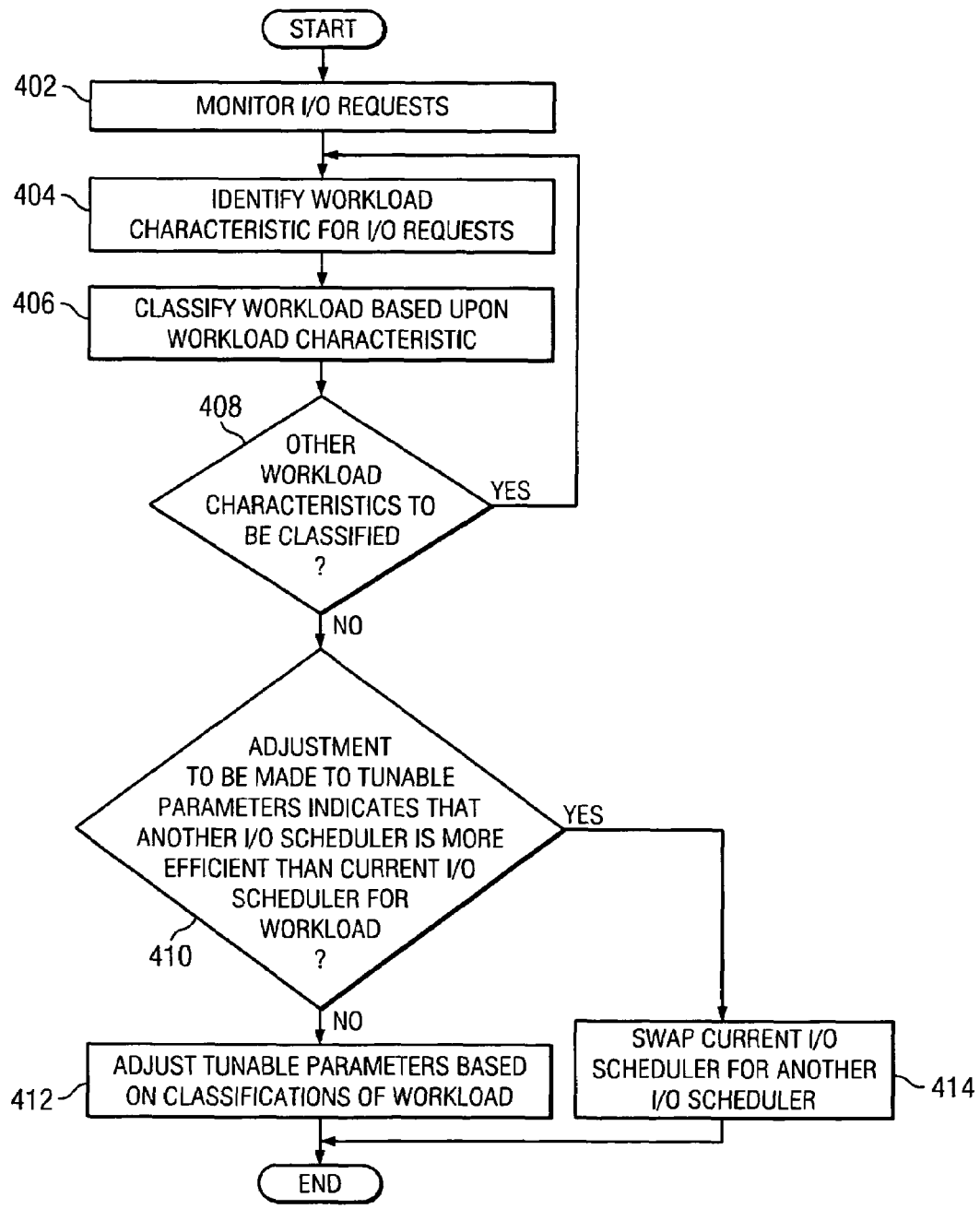
FIG. 4 is a flowchart illustrating a process used for input/output workload fingerprinting for input/output schedulers in accordance with an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs hub architecture including north bridge and memory controller hub (NB/MCH) 202 and south bridge and input/output (I/O) controller hub (SB/ICH) 204. data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more busses, such as bus 238 or bus 240 as shown in FIG. 2. Of course, the bus system may be implemented using any type of communication fabric or architecture that provides for a transfer of data between different components or devices attached to the fabric or architecture. A communications unit may include one or more devices used to transmit and receive data, such as modem 222 or LAN 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Embodiments of the present invention may be implemented using components of the network for the data processing system in FIG. 1, such as server 104 or storage 106. These embodiments may be implemented to serve the users of a network such as network 102 for the data processing system in FIG. 1, such as client 110, client 112, or client 114.

Embodiments of the present invention monitor and classify workloads for an input/output scheduler in order to tune the input/output scheduler to work more efficiently. After monitoring input/output requests for a pre-defined amount of time, a classification algorithm identifies a workload characteristic for the input/output requests and classifies the workload based upon the workload characteristic. The classification algorithm executes the identifying and classifying steps for different workload characteristics. Then the classification algorithm adjusts tunable parameters for the input/output scheduler based on the classifications of the workload.

FIG. 3 is a block diagram illustrating components used for input/output workload fingerprinting for input/output schedulers in accordance with an illustrative embodiment of the present invention. Application 302, application 304, application 306, and application 308 may reside on a single client, such as client 110 in FIG. 1, or these applications may be distributed across multiple clients, such as client 110, client 112, and client 114. I/O scheduler 310 may schedule input and output for multiple hard drives and CD ROMs such as hard disk 312, hard disk 314, hard disk 316, and CD ROM 318. I/O schedulers use differing techniques to group and merge requests to maximize request sizes, cutting down on the amount of seeking performed. Hard disk 314 may be implemented using storage, such as storage 108 in FIG. 1.

Embodiments of the present invention provide the ability to determine a "fingerprint" for a system's I/O workload. This fingerprinting is achieved by a classification algorithm breaking down the workload monitored during a pre-defined amount of time into small measurable characteristics, classifying the small measurable characteristics, and then assembling the classifications of the small characteristics into a fingerprint, such as fingerprint 320. A workload characteristic is one of many small measurable characteristics of a workload that may be measured based upon monitoring input/output requests. Examples of workload characteristics include the ratio of read requests to write requests, the seek distance between requests, and the average size of the requests. With all components residing in operating system 330, classification algorithm 300 assembles fingerprint 320 from classifications of workload characteristics to enable I/O schedulers, such as I/O scheduler 310, to achieve a number of goals. Through the use of fingerprint 320, classification algorithm 300 may swap the current I/O scheduler, such as I/O scheduler 310, for another I/O scheduler, such as I/O scheduler 340 or I/O scheduler 350. Alternatively, classification algorithm 300 may tune the I/O scheduler parameters to pre-defined settings for the tunable parameters based upon the workload. As discussed above, examples of tunable parameters may include a default read expire time-out period, a default write batch expire time-out period, and a write queue depth. The maximum default read expire time-out period and the minimum read expire time-out period are examples of parameters that are not tunable.

Finger print 320 generated for a particular workload of I/O requests may consist of a number of classifications. An illustrative example of a simple fingerprint, such as fingerprint 320, may include many classifications in addition to three general classifications. These three general classifications based on workload characteristics are I/O access type 322, which may be read or write, I/O access pattern 324, which may be sequential or random, and I/O access size 326, which may be large or small.

By classifying the workload based upon multiple classifications of workload characteristics, the classification algorithm generates a fingerprint to inform the current I/O scheduler how to operate more efficiently. I/O workload fingerprinting differs from the read-ahead classification because I/O workload fingerprinting examines all of the I/O occurring on a device, such as hard disk 314. A read-ahead classification only examines one particular file on a device, and does not take into account the rest of the I/O on the device. The broader perspective offered by the classification algorithm for I/O workload fingerprinting is a more accurate reflection of the device's workload.

I/O workload fingerprinting differs from the typical anticipatory I/O scheduler in several aspects. For example, unlike the classification algorithm for I/O workload fingerprinting, the typical anticipatory I/O scheduler does not examine I/O access size for I/O requests. The typical anticipatory I/O scheduler does not attempt to classify a request once the typical anticipatory I/O scheduler has determined that the request is a write request. The typical anticipatory I/O scheduler only attempts to classify read requests based upon what would be comparable to a sequential read request by examining the current disk head position. If a set of sequential read requests occurs, and these read requests are for sectors far from the current disk head position, the typical anticipatory I/O scheduler's heuristic does not determine that the access pattern is sequential. The classification algorithm for I/O workload fingerprinting examines all the sector distances for requests in order to determine an access pattern.

The classification algorithm for I/O workload fingerprinting uses the block layer of an operating system to monitor input/output requests, examine different characteristics of the input/output requests for an I/O workload and classifies these characteristics to create a fingerprint of the current workload type. The block layer of an operating system is the layer of the kernel that services I/O requests in blocks, such as a block of 512 bytes or a block of 4096 bytes, rather than servicing I/O requests based on characters. All operating systems that access hard disks have a block layer to service I/O requests. I/O schedulers and the classification algorithm are part of the block layer of an operating system. I/O workload fingerprinting may be implemented in a number of ways.

FIG. 4 is a flowchart illustrating a process used for input/output workload fingerprinting for input/output schedulers in accordance with an illustrative embodiment of the present invention. The process in FIG. 4 may be implemented in a classification algorithm, such as classification algorithm 300 in FIG. 3. In one embodiment for implementing I/O workload fingerprinting, the classification algorithm monitors I/O requests made during a pre-determined time slice (step 402), such as I/O requests made by application 302, application 304, application 306, and application 308 in FIG. 3. For example, the monitored I/O requests may include the number of read requests, the number of write requests, the average seek distance between requests on a device, and the average size of requests. As part of the block layer of the operating system, the classification algorithm has direct access to read the I/O counters that the operating system is already maintaining, such as the number of read requests and the number of write requests. In order to monitor workload characteristics such as the average size of the requests, aspects of the present invention include modifications to the operating system to compile this additional information during the process when the operating system updates the I/O counters that the operating system already maintains, such as the number of read requests and the number of write requests.

In response to the classification algorithm for I/O workload fingerprinting monitoring the I/O requests, the classification algorithm classifies the current workload based on the classifications of the workload characteristics determined. The classification algorithm identifies a workload characteristic for the I/O requests (step 404). Based upon the determination of a workload characteristic, the classification algorithm classifies the workload (step 406). Implementation of the identification step and the classification step are detailed further below in FIG. 5. If other workload characteristics are present to be classified, the classification routine returns to identifying step 404 (step 408). The classification algorithm determines if the adjustments to be made to the tunable parameters indicate that another I/O scheduler is more efficient than the current I/O scheduler for the current workload (step 410). If classification algorithm determines the adjustments to be made to the tunable parameters indicate that another I/O scheduler is more efficient than the current I/O scheduler for the current workload, the classification algorithm may swap I/O schedulers (step 414). Otherwise, the classification algorithm may adjust tunable parameters based on the classified workloads (step 412). Implementation of the adjusting step is detailed further below in the references to FIG. 6.

When the classification algorithm decides to swap the current I/O scheduler for another I/O scheduler, the classification algorithm stops the current I/O scheduler from accessing incoming I/O requests from the incoming I/O requests buffer. Next, the classification algorithm waits until the current I/O scheduler empties its queues of I/O requests. Then, the classification algorithm switches the operating system's function pointers from the current I/O scheduler to the next I/O scheduler. Finally, the classification algorithm initiates the new I/O scheduler to retrieve incoming I/O requests from the incoming I/O requests buffer. Details and examples of when the classification algorithm swaps I/O schedulers are listed further below in the discussion that follows immediately after the references to FIG. 6.

Figure 5:
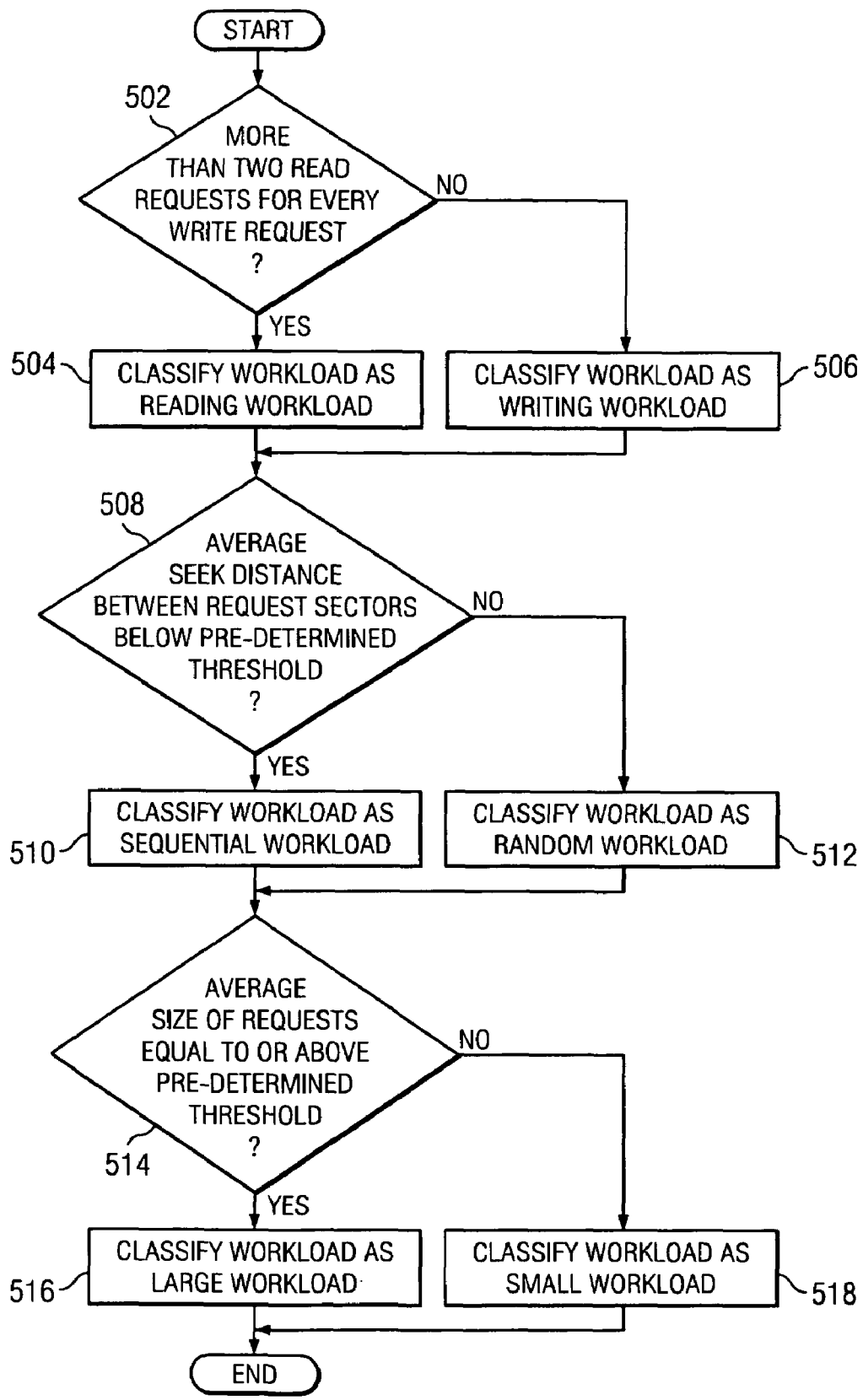
FIG. 5 is a flowchart illustrating a process used for identifying and classifying input/output workloads for input/output schedulers in accordance with an illustrative embodiment of the present invention.

FIG. 5 is a flowchart illustrating a process used for identifying and classifying input/output workloads for input/output schedulers, in accordance with an illustrative embodiment of the present invention. FIG. 5 is a more detailed description of the steps 404 and 406 in FIG. 4. The following example of classifying workload characteristics is for the purpose of illustration only, and not intended to imply any limitations for the present invention. For example, the classification algorithm may determine the ratio of read requests to write requests as a workload characteristic. In this illustrative example, the classification algorithm identifies if there are two or more read requests for every write request (step 502). If there are two or more read requests for every write request, then the classification algorithm classifies the workload as a reading workload (step 504). If there are less than two read requests for every write request, then the classification algorithm classifies the workload as a writing workload (step 506).

In another example of a workload characteristic, the seek distance between requests may be used to classify the access pattern because a sequential access pattern occurs when requests are for sectors normally close in proximity to each other while a random access pattern occurs when requests are for sectors spread across the disk. The classification algorithm identifies if the average seek distance between requested sectors is below a pre-determined threshold (step 508). If the average seek distance is below a pre-determined threshold, the classification algorithm classifies the workload as a sequential workload (step 510). If the average seek distance is equal to or above the pre-determined threshold, then the classification algorithm classifies the workload as a random workload (step 512).

In yet another example of a workload characteristic, the average size of the requests during the time slice may be used to classify the workload as large or small. The classification algorithm identifies if the average size of the requests is equal to or above a pre-determined threshold (step 514). If the request size is equal to or above a pre-determined threshold, the classification algorithm classifies the workload as a large workload (step 516). If the request size is below the pre-determined threshold, then the classification algorithm classifies the workload as a small workload (step 518). In one embodiment of the present invention, the workload characteristics that are classified by the classification algorithm are hard-coded into the process. In another embodiment of the present invention, the workload characteristics that are classified by the classification algorithm are listed in a process file that supplies the classification algorithm with a checklist. The user may modify the process file that determines which workload characteristics the classification algorithm classifies.

While many combinations exist for I/O workload fingerprints, fingerprints assembled from classifications based on the examples illustrated above may include sequential-large-reads and random-small-reads. Once the classification algorithm assembles an I/O workload fingerprint, the classification algorithm may adjust tunable parameters, and/or may swap the current I/O scheduler for another I/O scheduler.

Figure 6:
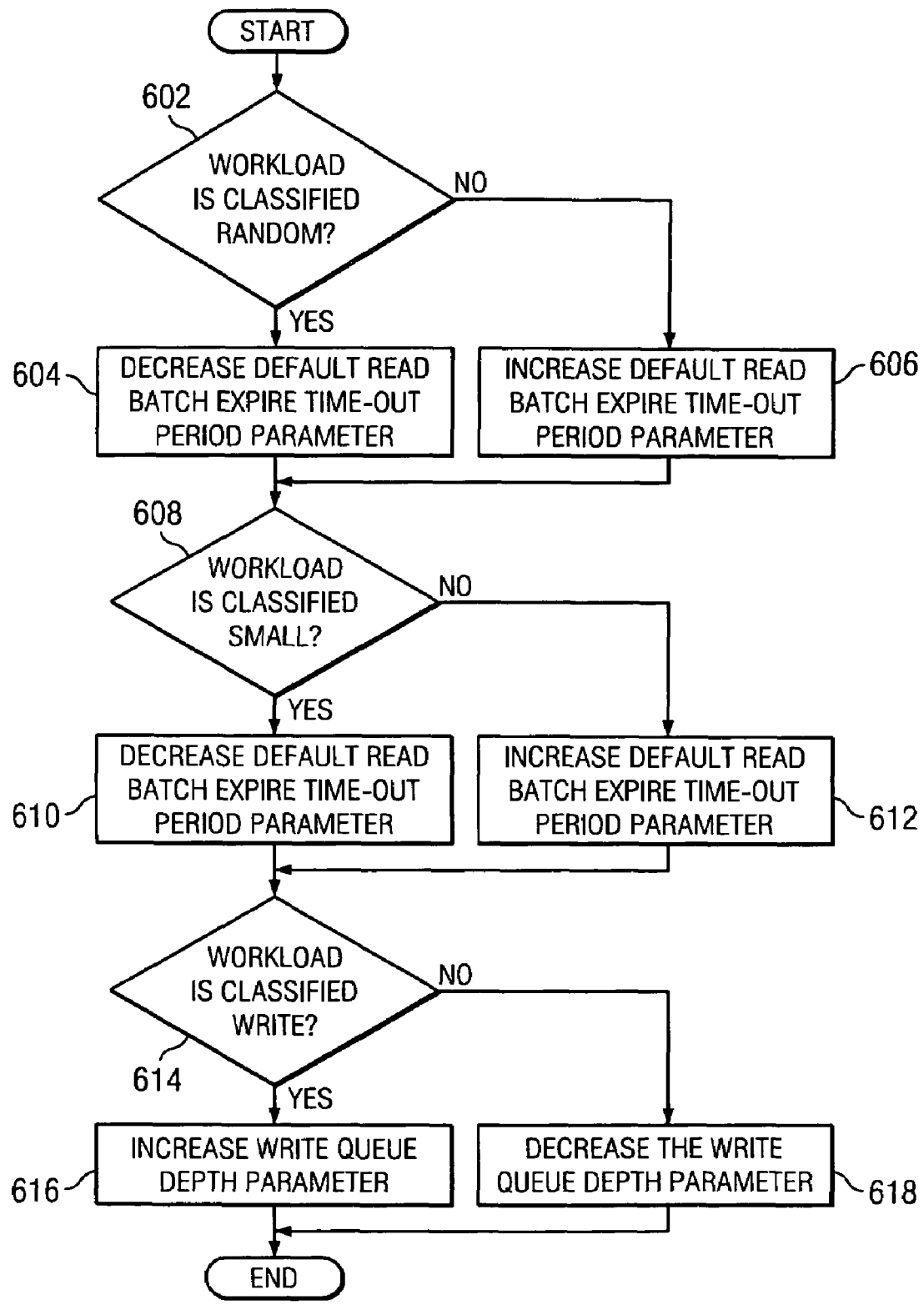
FIG. 6 is a flowchart illustrating a process used for tuning adjustable parameters for input/output schedulers in accordance with an illustrative embodiment of the present invention.

FIG. 6 is a flowchart illustrating a process used for tuning adjustable parameters for input/output schedulers, in accordance with an illustrative embodiment of the present invention. FIG. 6 is a more detailed description of the step 412 in FIG. 4. For example, the classification algorithm determines if a workload is classified random (step 602). If the workload is classified as random, the classification algorithm may decrease a default read batch expire time-out period parameter (step 604). If a workload is not classified as random, the classification algorithm may increase the default read batch expire time-out period parameter (step 606). Next, the classification algorithm determines if a workload is classified as small (step 608). If the workload is classified as small, the classification algorithm may decrease the default read batch expire time-out period parameter (step 610). If the workload is not classified as small, the classification algorithm may increase the default read batch expire time-out period parameter (step 612). Then, the classification algorithm determines if a workload is a write workload (step 614). If the workload is classified as a write workload, the classification algorithm may increase the write queue depth parameter (step 616). If the workload is not classified as a write workload, the classification algorithm may decrease the write queue depth parameter (step 618).

The classification algorithm has the option of executing the process illustrated in FIG. 6 to adjust tunable parameters for input/output schedulers. However, if the classification algorithm determines that the adjustments to be made to the tunable parameters indicate that another I/O scheduler is more efficient than the current I/O scheduler for the current workload, then the classification algorithm may swap I/O schedulers. The following is a more detailed description of step 414 in FIG. 4 of swapping the current I/O scheduler for another I/O scheduler. Some adjustments to be made to tunable parameters may indicate that another I/O scheduler is more efficient than the current I/O scheduler for the current workload. The classification algorithm maintains a list of specific I/O schedulers that are not efficient for specific combinations of workload classifications that require specific adjustments to tunable parameters. If the adjustments to be made to tunable parameters indicate that another I/O scheduler is more efficient than the current I/O scheduler for the current workload, the classification algorithm may swap the current I/O scheduler for another I/O scheduler. I/O schedulers use differing techniques to group and merge requests to maximize request sizes, cutting down on the amount of seeking performed. A no-operation scheduler is a simple first-in first-out queue and uses the minimal amount of CPU/instructions per I/O request to accomplish the basic merging and sorting functionality to complete the I/O requests. An anticipatory I/O scheduler, as discussed above, introduces a controlled delay before dispatching the I/O to attempt to aggregate and/or re-order requests improving locality and reducing disk seek operations. A complete fair queuing I/O scheduler treats all competing processes equally by assigning each process a unique request queue and giving each queue equal bandwidth. A deadline I/O scheduler implements a per-request service deadline to ensure that no requests are neglected. Using multiple I/O queues, the deadline I/O scheduler will aggressively re-order requests to avoid process starvation.

For example, if the classification algorithm classifies a workload as a random-small-write workload, after any adjustments to tunable parameters, the classification algorithm may swap the current anticipatory I/O scheduler for a deadline I/O scheduler, a more efficient I/O scheduler for a random-small-write workload. If the classification algorithm classifies a workload as a large-sequential-read workload, after any adjustments to tunable parameters the classification algorithm may swap the current complete fair queuing I/O scheduler for an anticipatory I/O scheduler, a more efficient I/O scheduler for a large-sequential-read workload.

After the classification algorithm adjusts tunable parameters, and/or swaps the current I/O scheduler for another I/O scheduler, the classification algorithm monitors more I/O requests over a pre-determined amount of time. Then I/O workload fingerprinting process repeats itself.

Overall, embodiments of the present invention solve a problem that is not addressed using currently available approaches. The process as shown in FIG. 4 provides input/output workload fingerprinting for input/output schedulers. This process monitors and classifies workloads for an input/output scheduler in order to tune the input/output scheduler to work more efficiently.

The invention can take the form of an entirely hardware embodiment, an entirely software embodiment, or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system.

For the purposes of this description, a computer-usable or computer readable medium can be any tangible apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable storage medium include a semiconductor, a solid-state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for monitoring workloads, the computer implemented method comprising:
   identifying a plurality of input/output requests in a workload for an input/output scheduler;
   classifying each request in the plurality of input/output requests to form a set of classifications, wherein the plurality of input/output requests is classified using workload characteristics, and wherein the workload characteristics are characteristics of read requests and write requests;
   assembling the set of classifications into an input/output workload fingerprint;
   determining whether an action is needed based on the fingerprint, wherein the determining step comprises maintaining a list of specific input/output schedulers that are inefficient for specific combinations of workload characteristics that require specific adjustments to tunable parameters; and
   initiating the action if the action is needed, wherein the initiating step comprises at least one of automatically swapping the input/output scheduler for a new input/output scheduler and altering a tunable parameter used by the input/output scheduler to process the workloads, wherein the tunable parameter is selected from a group consisting of a default read expire time-out, a default write expire time-out, a default read batch expire time-out, a default write batch expire time-out, a read queue depth, and a write queue depth.

2. The computer implemented method of claim 1, wherein the plurality of requests is a sample of input and output requests taken over a period of time.

3. The computer implemented method of claim 1, wherein automatically swapping the input/output scheduler for a new input/output scheduler comprises:
   stopping the input/output scheduler from accessing incoming input/output requests;
   waiting until the input/output scheduler empties its queue of input/output requests;
   switching function pointers of an operating system from the input/output scheduler to the new input/output scheduler; and
   initiating the new input/output scheduler to retrieve incoming input/output requests.

4. The computer implemented method of claim 1, wherein the fingerprint informs the input/output scheduler how to operate more efficiently.

5. The computer implemented method of claim 3, wherein the input/output scheduler and the new input/output scheduler are selected from a no-operation scheduler, an anticipatory input/output scheduler, a complete fair queuing input/output scheduler, and a deadline input/output scheduler.

6. The computer implemented method of claim 1, wherein the workload characteristics are selected from a ratio of input/output read requests to input/output write requests, an average seek distance between input/output requests on a device, and an average of input/output requests.

7. A data processing system for a pattern for input/output workload fingerprinting for input/output schedulers, the data processing system comprising:
   a bus;
   a storage device connected to the bus, wherein the storage device contains computer usable code;
   a communications unit connected to the bus; and
   a processing unit connected to the bus, wherein the processing unit executes the computer usable code to:
   identify a plurality of input/output requests in a workload for an input/output scheduler; classify each request in the plurality of input/output requests to form a set of classifications, wherein the plurality of input/output requests is classified using workload characteristics, and wherein the workload characteristics are characteristics of read requests and write requests; assemble the set of classifications into an input/output workload fingerprint; determine whether an action is needed based on the fingerprint, wherein the determining step comprises computer usable code to maintain a list of specific input/output schedulers that are inefficient for specific combinations of workload characteristics that require specific adjustments to tunable parameters; and initiate the action if the action is needed, wherein the initiating step comprises computer usable code to at least one of automatically swapping the input/output scheduler for a new input/output scheduler and altering a tunable parameter used by the input/output scheduler to process the workloads, wherein the tunable parameter is selected from a group consisting of a default read expire time-out, a default write expire time-out, a default read batch expire time-out, a default write batch expire time-out, a read queue depth, and a write queue depth.

8. The data processing system of claim 7, wherein the plurality of requests is a sample of input and output requests taken over a period of time.

9. The data processing system of claim 7, wherein the processor further executes the computer usable code to automatically swap the input/output scheduler for a new input/output scheduler to:
   stop the input/output scheduler from accessing incoming input/output requests;

wait until the input/output scheduler empties its queue of input/output requests;

switch function pointers of an operating system from the input/output scheduler to the new input/output scheduler; and initiate the new input/output scheduler to retrieve incoming input/output requests.

10. The data processing system of claim 7, wherein the fingerprint informs the input/output scheduler how to operate more efficiently.

11. The data processing system of claim 9, wherein the input/output scheduler and the new input/output scheduler are selected from a no-operation scheduler, an anticipatory input/output scheduler, a complete fair queuing input/output scheduler, and a deadline input/output scheduler.

12. The data processing system of claim 7, wherein the workload characteristics are selected from a ratio of input/output read requests to input/output write requests, an average seek distance between input/output requests on a device, and an average size of input/output requests.

13. A computer program product for input/output workload fingerprinting for input/output schedulers, the computer program product comprising:

a computer readable storage medium having computer usable program code embodied therein;

computer usable program code configured to identify a plurality of input/output requests in a workload for an input/output scheduler;

computer usable program code configured to classify each request in the plurality of input/output requests to form a set of classifications, wherein the plurality of input/output requests is classified using workload characteristics, and wherein the workload characteristics are characteristics of read requests and write requests;

computer usable program code configured to determine whether an action is needed based on the fingerprint, wherein the computer usable program code configured to determine whether an action is needed further comprises computer usable program code configured to maintain a list of specific input/output schedulers that are inefficient for specific combinations of workload characteristics that require specific adjustments to tunable parameters; and computer usable program code configured to initiate the action if the action is needed, wherein the computer usable program code configured to initiate the action further comprises computer usable program code configured to at least one of automatically swapping the input/output scheduler for a new input/output scheduler and altering a tunable parameter used by the input/output scheduler to process the workloads, wherein the tunable parameter is selected from a group consisting of a default read expire time-out, a default write expire time-out, a default read batch expire time-out, a default write batch expire time-out, a read queue depth, and a write queue depth.

14. The original computer program product of claim 13, wherein the plurality of requests is a sample of input and output requests taken over a period of time.

15. The computer program product of claim 13, wherein the computer usable program code configured to automatically swap the input/output scheduler for a new input/output scheduler further comprises:

computer usable program code configured to stop the input/output scheduler from accessing incoming input/output requests;

computer usable program code configured to wait until the input/output scheduler empties its queue of input/output requests;

computer usable program code configured to switch function pointers of an operating system from the input/output scheduler to the new input/output scheduler; and computer usable program code configured to initiate the new input/output scheduler to retrieve incoming input/output requests.

* * * * *